United States Patent
Wiste

[19]

[11] Patent Number: 5,857,288
[45] Date of Patent: Jan. 12, 1999

[54] RIGHT ANGLE LAWN EDGING AND METHOD THEREFOR

[76] Inventor: Wayne V. Wiste, 705 Lakeview Dr., La Crosse, Wis. 54603

[21] Appl. No.: 709,476

[22] Filed: Sep. 5, 1996

[51] Int. Cl.⁶ ....................................................... A01G 1/08
[52] U.S. Cl. .................................................................... 47/33
[58] Field of Search ................................................... 47/33

[56] References Cited

U.S. PATENT DOCUMENTS

| | | | |
|---|---|---|---|
| 2,842,344 | 7/1958 | Todd | 47/33 X |
| 3,777,421 | 12/1973 | Bomba et al. | 47/33 |
| 4,809,459 | 3/1989 | Brylla et al. | 47/33 |
| 5,640,801 | 6/1997 | Rynberk | 47/33 |

FOREIGN PATENT DOCUMENTS

| | | | |
|---|---|---|---|
| 2694866 | 2/1994 | France | 47/33 |
| 2336535 | 2/1975 | Germany | 47/33 |
| 3127920 | 1/1983 | Germany | 47/33 |
| 3804120 | 8/1989 | Germany | 47/33 |
| 2232052 | 12/1990 | United Kingdom | 47/33 |

OTHER PUBLICATIONS

"Improvements" Catalog; Author: Unknown; p. 6; Published: Fall, 1994; Beachwood, Ohio 44122–5808.

*Primary Examiner*—John A. Ricci
*Attorney, Agent, or Firm*—Robert J. Harter

[57] ABSTRACT

Plastic extruded lawn edging includes a vertical panel and a horizontal panel that are reconfigurable to a storage position and an installed position. In the storage position, the lawn edging has a relatively low minimum moment of inertia for the flexibility of coiling about itself. In the installed position, the lawn edging has a higher minimum moment of inertia for greater rigidity when in use. The horizontal panel is wide enough to support the wheel of a lawnmower and provides a band along which no grass can grow. The horizontal panel eliminates the need for grass trimming wherever it is used, such as along side the outer wall of a house or around a garden.

8 Claims, 8 Drawing Sheets

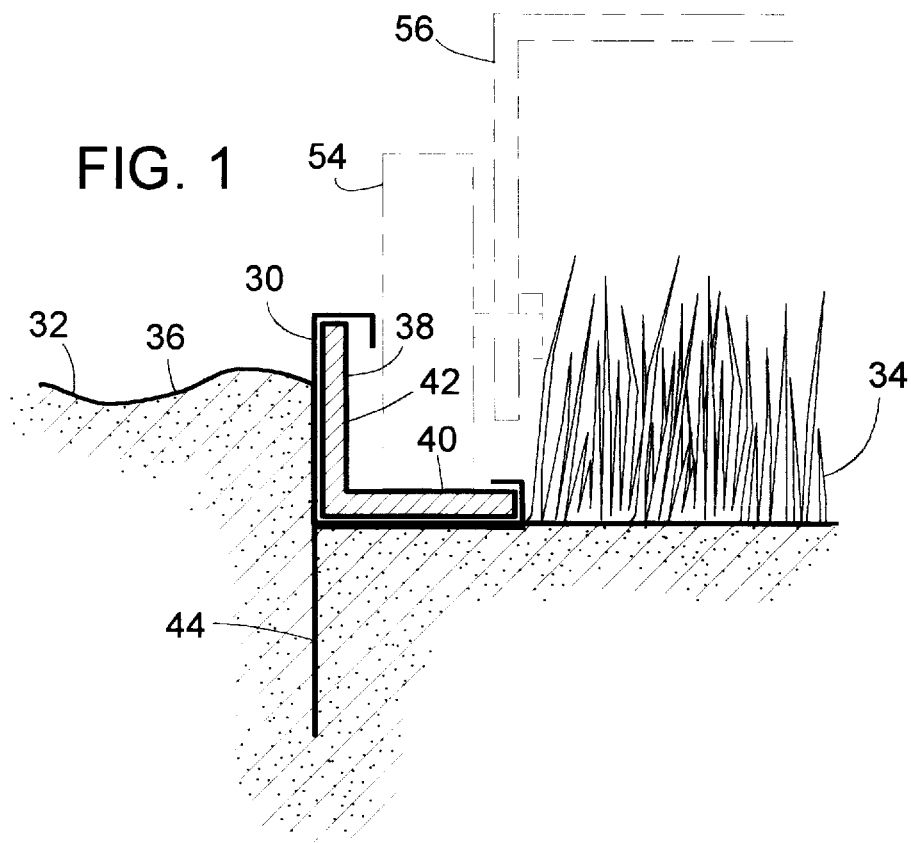
FIG. 1
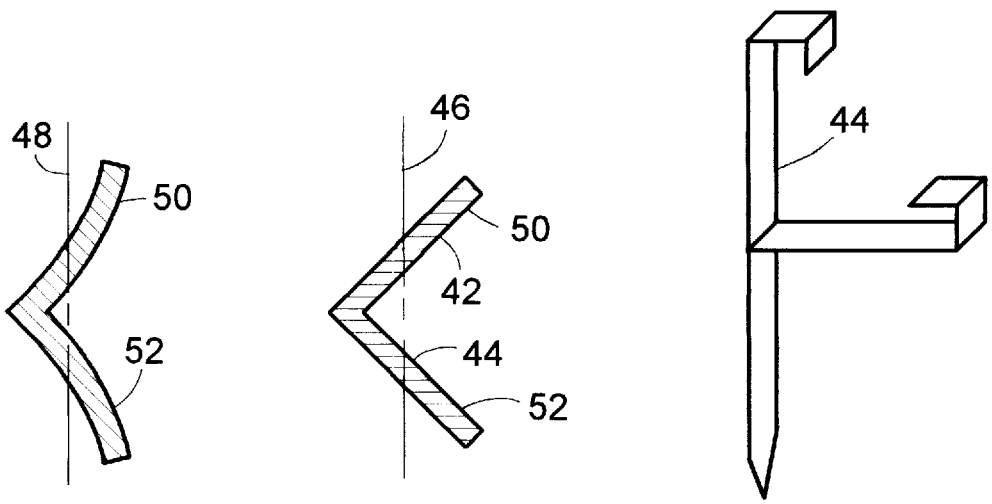
FIG. 2
FIG. 4
FIG. 3

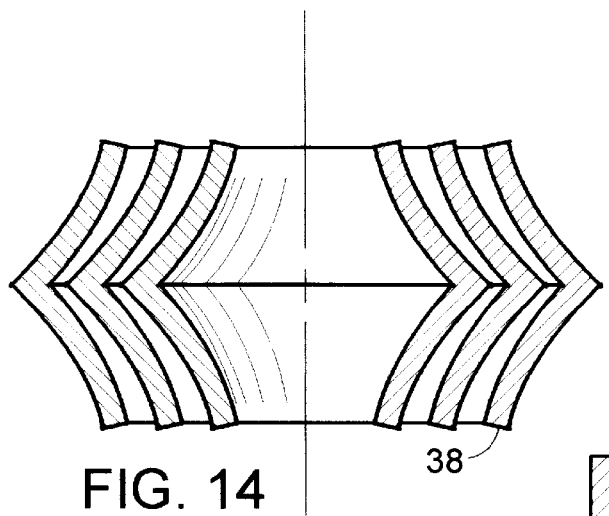
FIG. 14
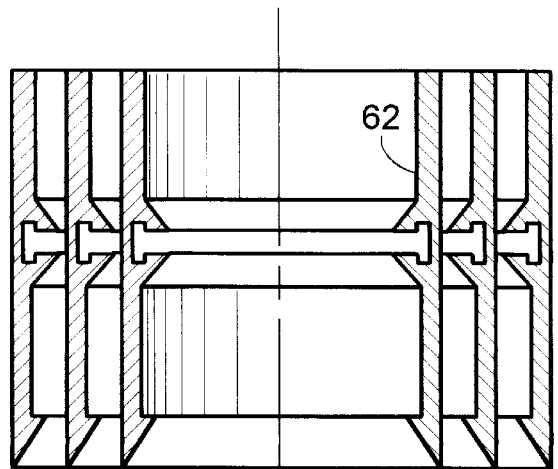
FIG. 15
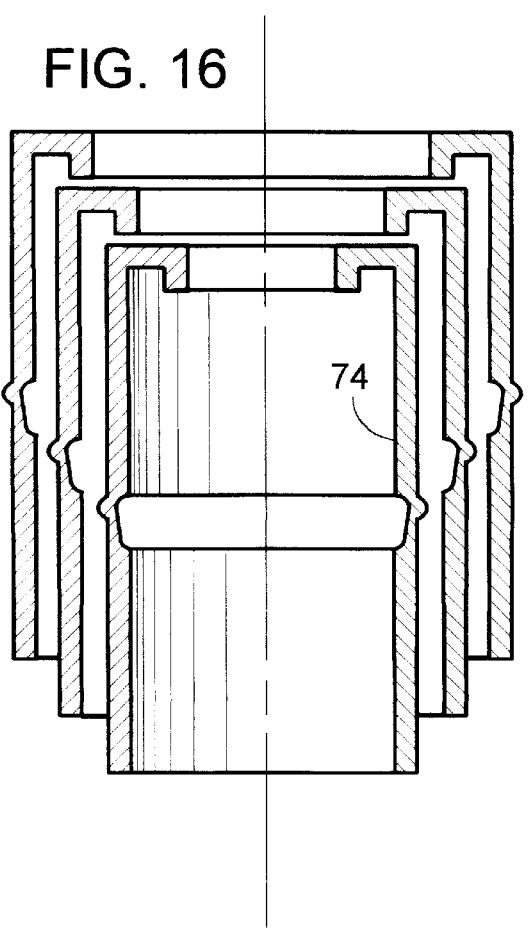
FIG. 16
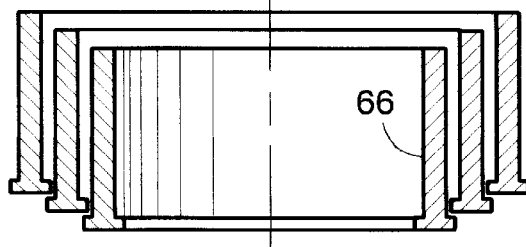

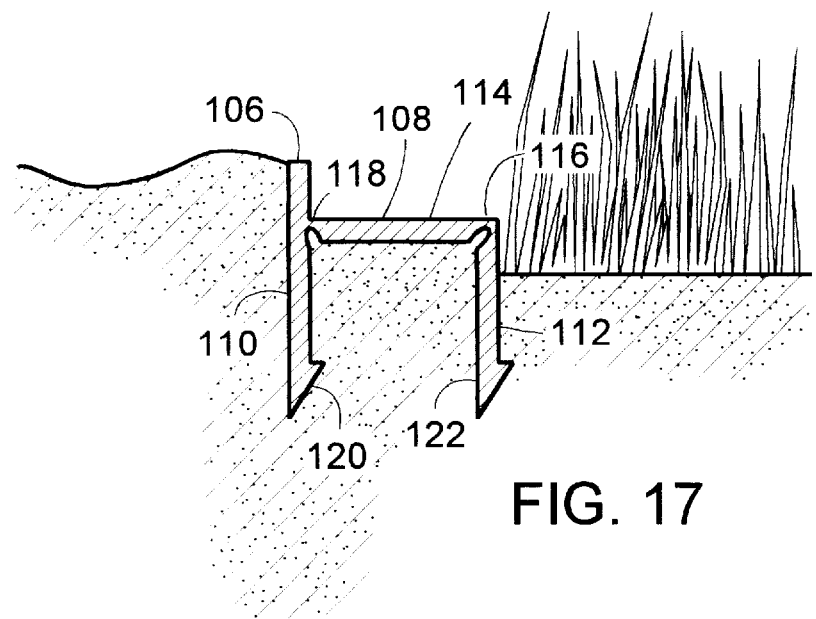
FIG. 17
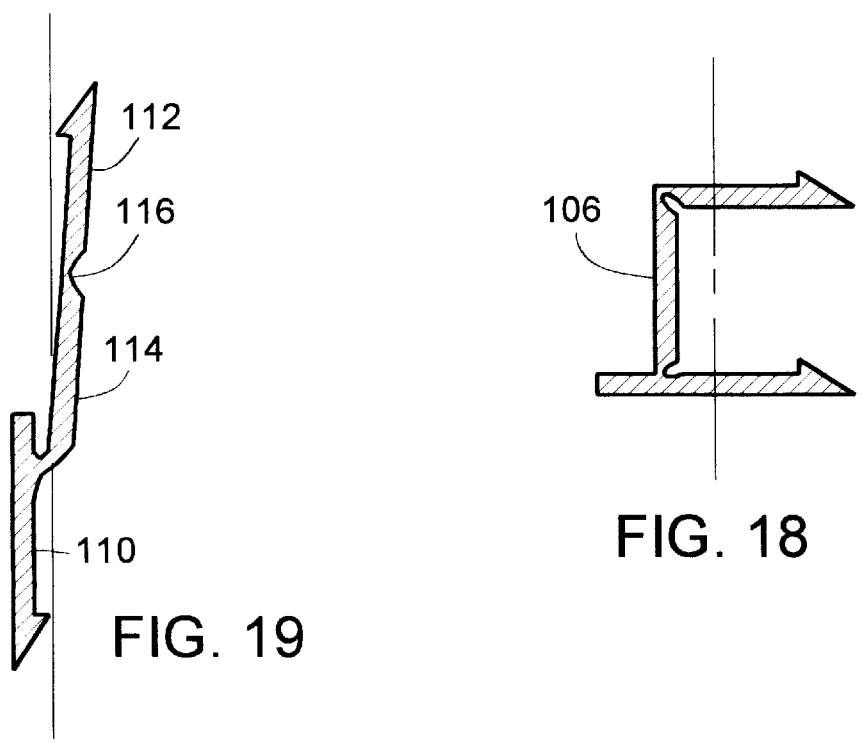
FIG. 18
FIG. 19

RIGHT ANGLE LAWN EDGING AND METHOD THEREFOR

BACKGROUND OF THE INVENTION

1. Field of the Invention

The subject invention generally pertains to lawn edging, and more specifically, to lawn edging that is extruded plastic.

2. Description of Related Art

Typical extruded plastic lawn edging simply comprises a vertical panel embedded in the ground. Such a design still requires weed eater-style lawn trimming along the edge. Otherwise, a mower blade may clip off the upper edge of the lawn edging.

SUMMARY OF THE INVENTION

To avoid the problems with current lawn edging, it is an object of the invention to provide extruded lawn edging having both horizontal and vertical panels that is flexible enough to be coiled for shipping and storage.

Another object is to provide lawn edging with a horizontal panel that is wide enough to support the wheel of a lawnmower.

Another object is to provide lawn edging with a horizontal panel that can be laid along the base of a house or other exterior wall to eliminate the need for trimming the grass there.

Another object is to provide extruded lawn edging that can follow elevational contours of hills and valleys.

Yet another object is to provide lawn edging that can be reconfigured to provide dual minimum moments of inertia so that in one configuration, the lawn edging is relatively flexible for coiling about itself for shipping and storage, while the other configuration provides a relatively rigid installation.

These and other objects of the invention are provided by a novel lawn edging having a horizontal panel and a vertical panel that can be reconfigured to provide a flexible configuration for coiling about itself for shipping and storage and a rigid configuration when installed.

BRIEF DESCRIPTION OF THE DRAWINGS

FIG. 1 is a cross-sectional side view of the invention under the wheel of a lawnmower.

FIG. 2 illustrates a separate anchor.

FIG. 3 shows a cross-sectional view of a runner in one configuration.

FIG. 4 shows the runner of FIG. 3 in another configuration.

FIG. 14 shows the runner of FIG. 1 coiled.

FIG. 15 shows the runner of FIG. 5 coiled.

FIG. 16 shows the runner of FIG. 8 coiled.

FIG. 17 shows a cross-sectional view of another embodiment of the invention.

FIG. 18 shows the edging of FIG. 17 in the installed configuration.

FIG. 19 shows the edging of FIG. 17 in the storage configuration.

DESCRIPTION OF THE PREFERRED EMBODIMENT

Figure 5:
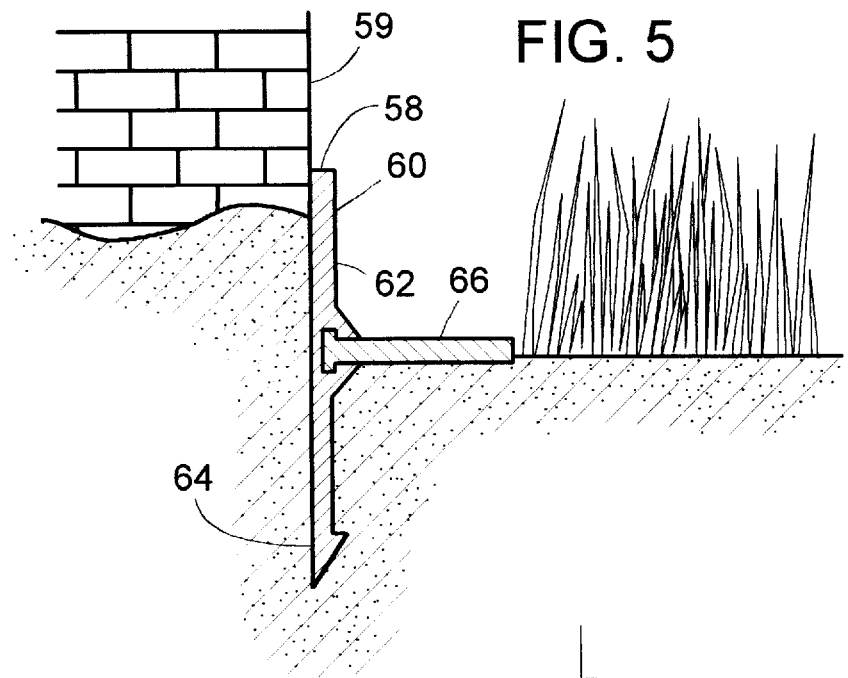
FIG. 5 shows lawn edging with a removable cover panel.

Referring to FIG. 1, lawn edging 30 divides land 32 between a first section 34 having a lawn and a second section 36 beyond said lawn. Examples of second section 36 include but are not limited to a garden, wall and gravel.

Lawn edging 30 includes a generally uniform cross-sectional plastic extruded runner 38 having a cover panel 40 perpendicular to a riser panel 42. Lawn edging 30 also includes an anchor 44 (FIG. 2) that holds runner 38 to land 32. In one embodiment of the invention, anchor 44 is made of metal and is driven into the ground like a tent stake.

The cross-sectional area of runner 38 provides various moments of inertia (integral of the area times the squared distance between the area and a line of reference) depending upon the location of the reference line about which the moment of inertia is calculated and the configuration (i.e., shape) of the cross-sectional area. For runner 38 in the first configuration (installed working position) of FIG. 3, the minimum cross-sectional moment of inertia is believed to be when the moment of inertia is calculated with reference to line 46 at the position shown. Runner 38 in the second configuration (for storage and shipping) of FIG. 4, the minimum cross-sectional moment of inertia is believed to be when the moment of inertia is calculated with reference to line 48 at the position shown. With legs 50 and 52 bent slightly outward, the second configuration provides a lower moment of inertia than does the first configuration. A lower moment of inertia offers greater flexibility and facilitates coiling runner 38 about itself for storage and shipping (see FIG. 14). A higher moment of inertia provides greater rigidity which is desirable when a runner is installed in its working position. The working position is the approximate cross-sectional shape of the runner when it is installed on the ground. It should be noted that cover panel 40 is wide enough to support a wheel 54 of a lawnmower 56.

Figure 6:
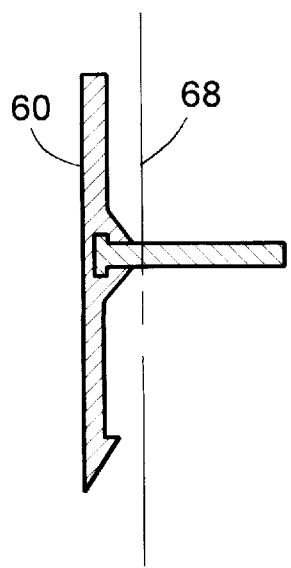
FIG. 6 shows the lawn edging of FIG. 5 in an installed configuration.
Figure 7:
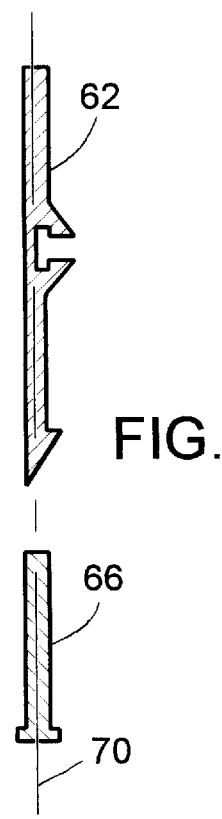
FIG. 7 shows the lawn edging of FIG. 5 in a storage position.

In FIG. 5, lawn edging 58 (against a wall 59) includes a runner 60 having a riser panel 62 with an integral anchor 64 and a removable cover panel 66. In FIG. 6, cover panel 66 is attached to provide a relatively high moment of inertia with reference to line 68. In FIG. 7, cover panel 66 is removed and relocated to provide a second configuration having a much lower moment of inertia with reference to line 70. The lower moment of inertia allows runner 60 to be coiled about line 72 of FIG. 15.

Figure 8:
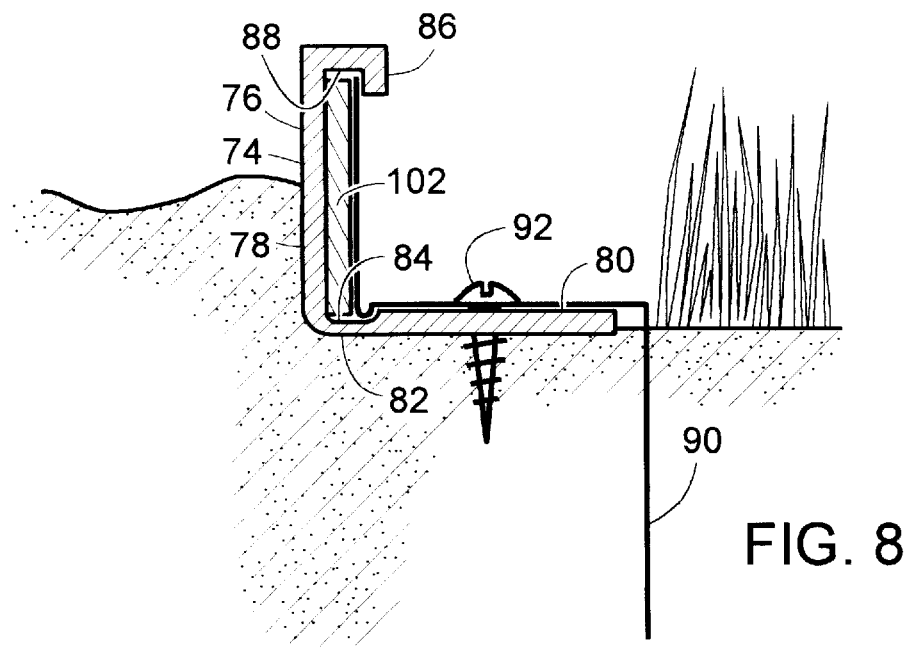
FIG. 8 shows a cross-sectional side view of another embodiment of the invention.
Figures 9, 10, 11:
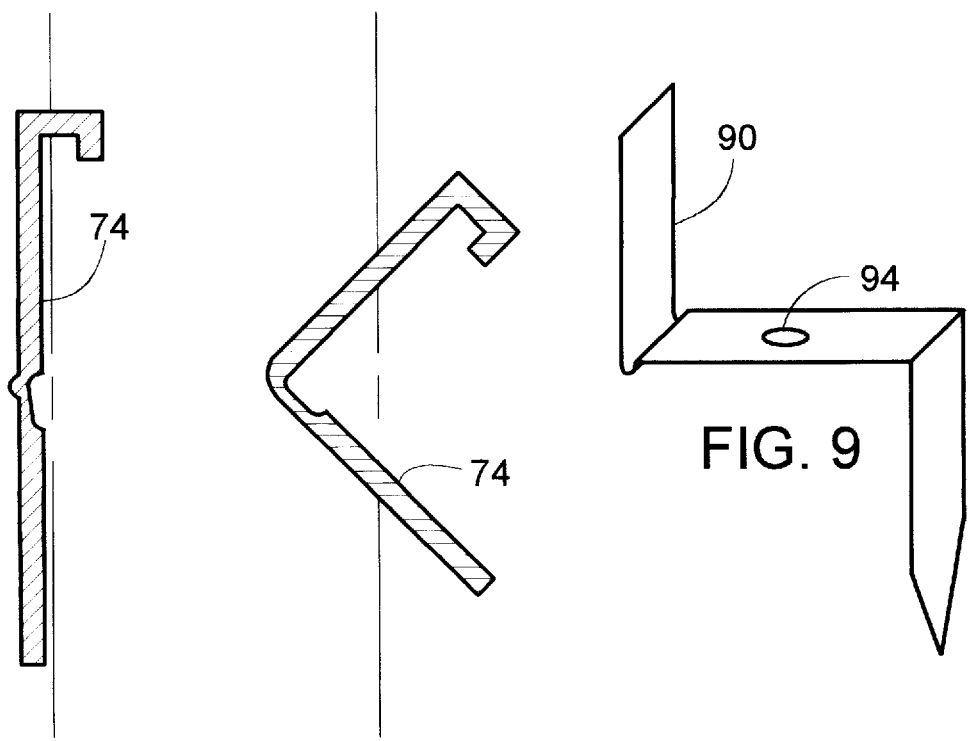
FIG. 9 shows another style of anchor.
FIG. 10 is the runner of FIG. 8 in the installed position.
FIG. 11 is the runner of FIG. 8 in the storage position.

In FIG. 8, a runner 74 of lawn edging 76 includes a riser panel 78 joined to a cover panel 80 by way of an integral hinge 82. Hinge 82 defines a lower groove 84, and an upper lip 86 of riser 78 defines an upper groove 88 spaced apart from lower groove 84. A metal anchor 90 (FIG. 9) engages grooves 84 and 88. A fastener 92 (e.g., screw, stake, nail, snap, etc.) may be optionally installed through hole 94 and into runner 74 to provide a more solid assembly. Hinge 82 allows two configurations having different minimum moments of inertia as shown in FIGS. 10 and 11.

Figure 12:
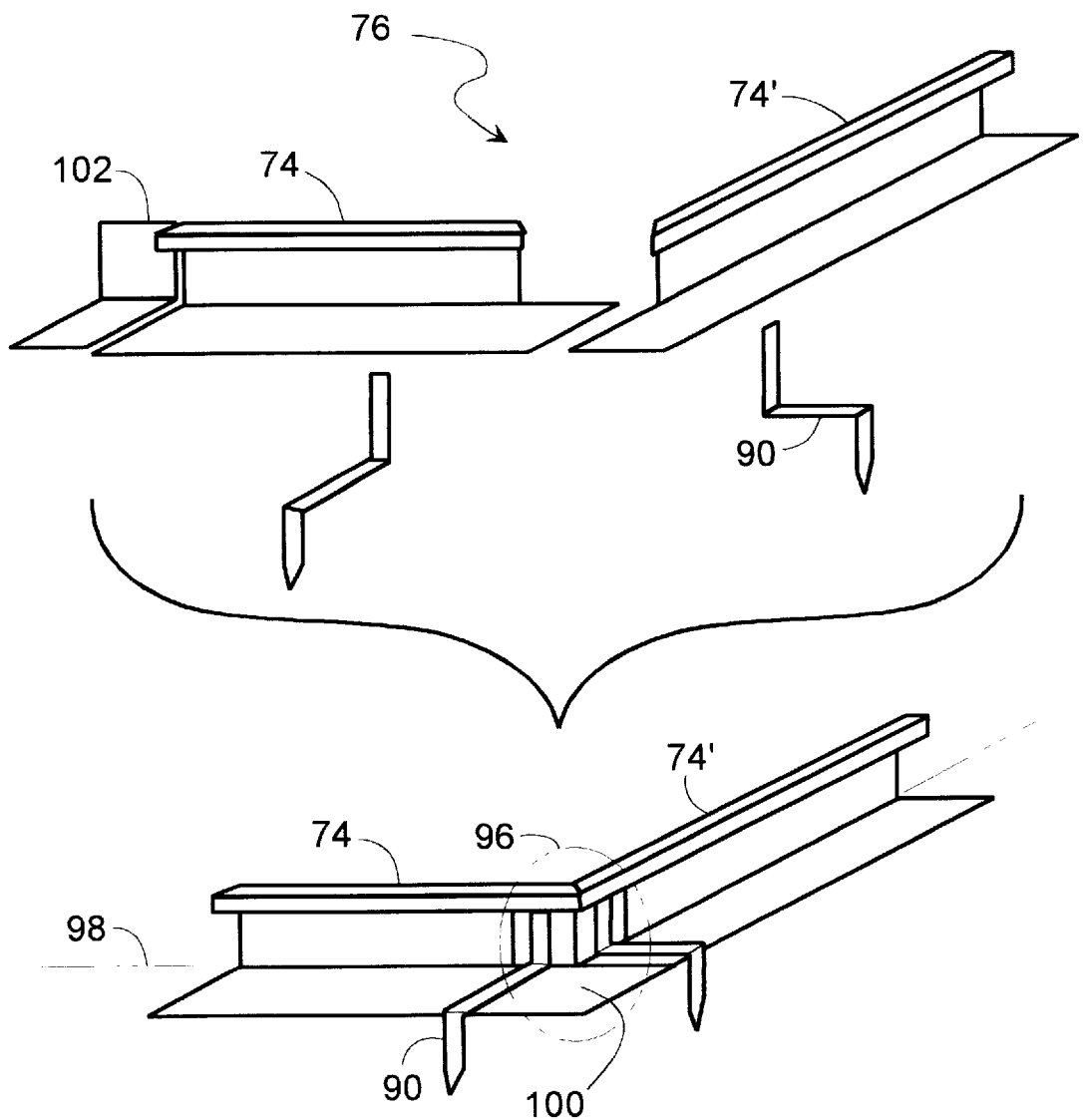
FIG. 12 shows the assembly of an outside corner.
Figure 13:
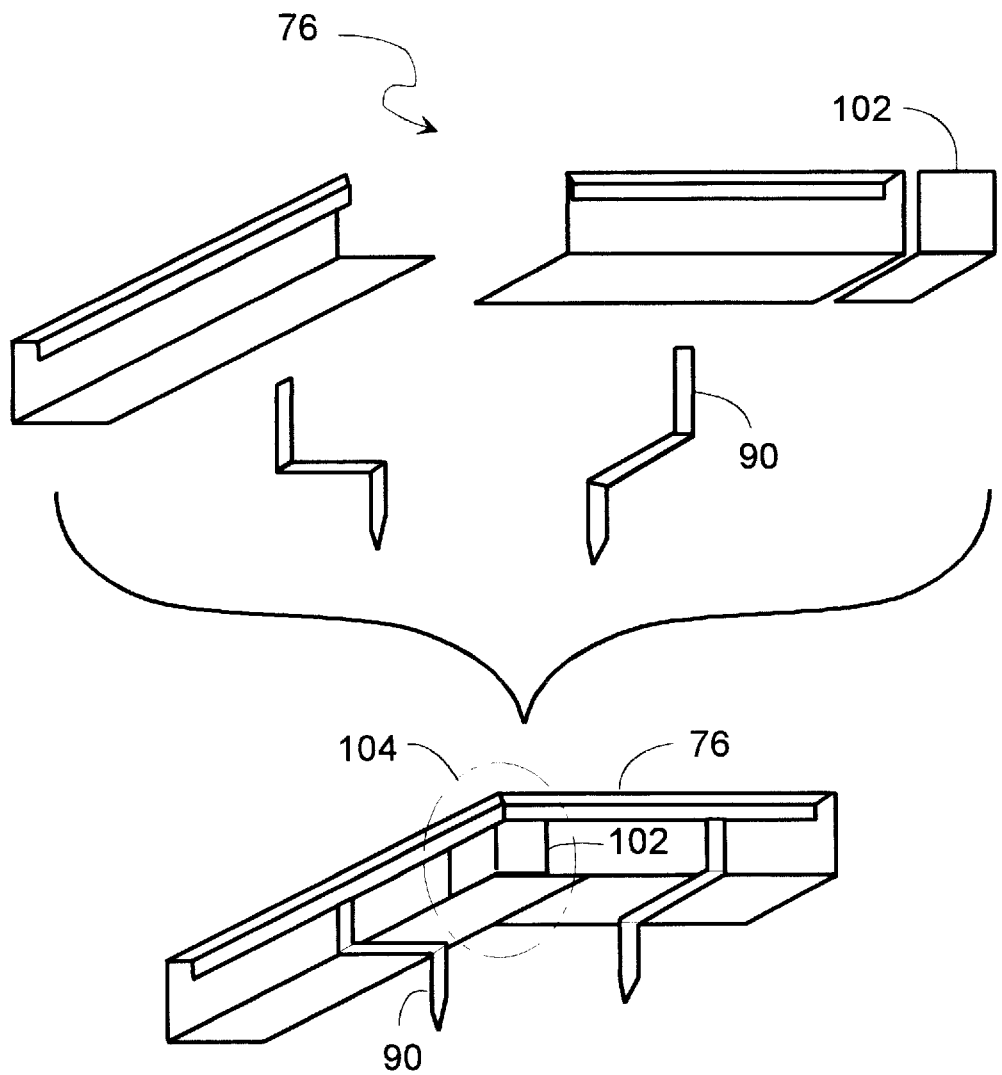
FIG. 13 shows the assembly of an inside corner.

FIG. 12 shows lawn edging 76 assembled to form an outside corner 96 along a path 98. Runners 74 and 74' are cut to provide an overlap 100 at corner 96 and also to provide a splice 102 that offers reinforcement at corner 96. FIG. 13 shows lawn edging 76 assembled to form an inside corner 104.

With the lower minimum moment of inertia, runner 38 can be coiled as shown in FIG. 14, runner 62 can be coiled as shown in FIG. 15, and runner 74 can be coiled as shown in FIG. 16.

In FIG. 17, a lawn edging 106 comprises a runner 108 having two riser panels 110 and 112 integrally joined to a cover panel 114 by way of two parallel running integral hinges 116 and 118. Anchors 120 and 122 are integrally joined to riser panels 110 and 112, respectfully. When installed, anchors 120 and 122 face the same direction to facilitate installation (first 120, then 122) and provide tight abutment (of anchor 120) against a wall when desired. Hinges 116 and 118 allow two configurations having different minimum moments of inertia as shown in FIGS. 18 and 19.

Figure 20:
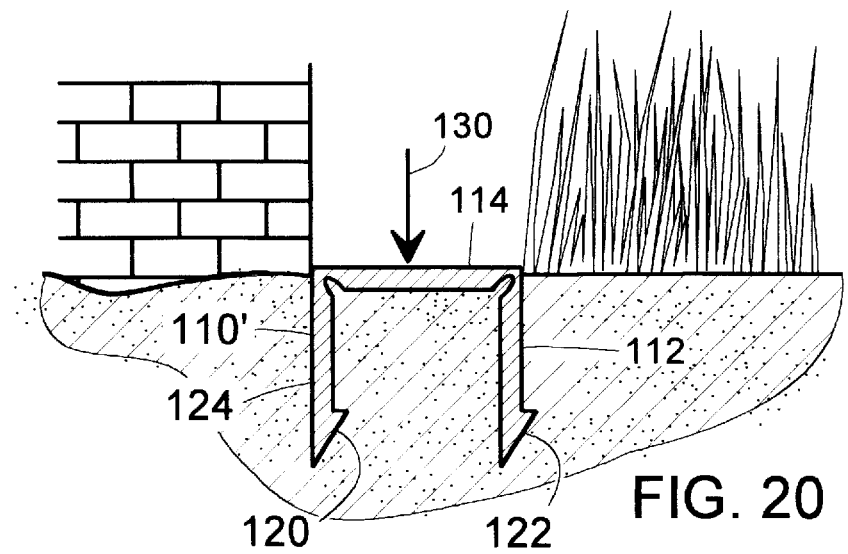
FIG. 20 shows a cross-sectional view of another embodiment of the invention.
Figure 21:
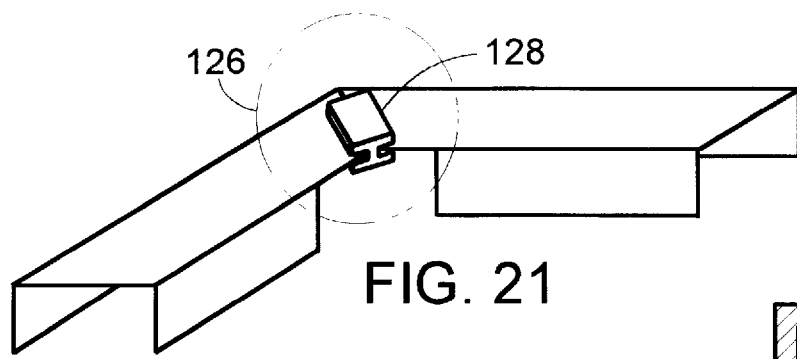
FIG. 21 shows the edging of FIG. 20 forming a corner.

Lawn edging 124 of FIG. 20 is the same as that of FIG. 17, except riser panel 110' is shorter than riser 110. This design readily accommodates inside and outside corners 126 as shown in FIG. 21. At each corner 126 only one riser and cover panel is cut while the other riser is simply bent. In addition, edging 124 more readily follows elevational contours (hills and valleys) by cutting both risers 110' and 112 while bending cover panel 114. An optional connector 128 can be installed at the joint as shown.

Figure 22:
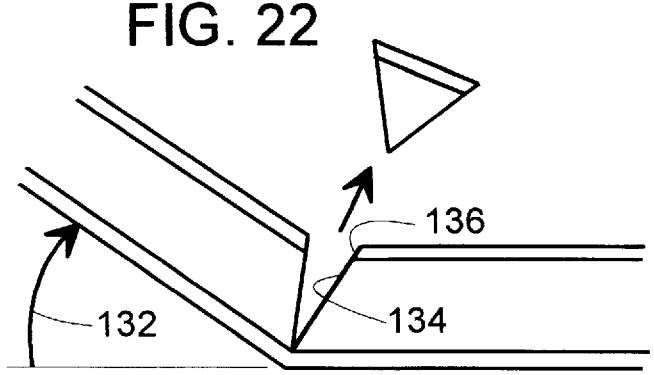
FIG. 22 is a bottom view of the FIG. 20 edging showing the steps for producing a corner.

FIG. 22 is a bottom view of edging 124 illustrating the steps to produce a corner joint. Arrow 130 of FIG. 20, represents burying, arrow 132 of FIG. 22 represents bending, and items 134 and 136 represent cutting.

Figure 23:
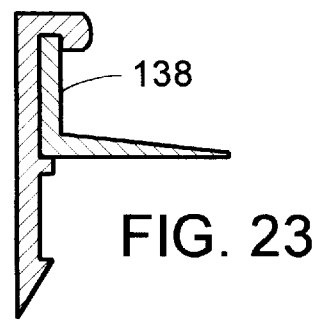
FIG. 23 shows a cross-sectional view of another embodiment of the invention.

Lawn edging 138 of FIG. 23 combines the features of those shown in FIGS. 1 and 5.

It should be noted that the term "uniform cross-sectional area" is intended to refer to items that are readily plastic extruded and includes extrusions that may have been subsequently processed with secondary manufacturing processes such as drilling, cutting, forming, gluing, etc.

Although the invention is described with respect to a preferred embodiment, modifications thereto will be apparent to those skilled in the art. Therefore, the scope of the invention is to be determined by reference to the claims which follow.

I claim:

1. A lawn edging for dividing land between a first section having a lawn and a second section beyond said lawn, said lawn being adapted for mowing by way of a lawnmower having a wheel, said lawn edging comprising:

a cover panel overlaying said first section having said lawn, said cover panel being of sufficient width to support said wheel;

a riser panel connected substantially perpendicular to said cover panel and extending substantially vertically between said first section having said lawn and said second section beyond said lawn, said cover panel in conjunction with said riser panel providing a runner that is resilient and reconfigurable for providing said runner with a first minimum cross-sectional moment of inertia in one configuration and having a second minimum cross-sectional moment of inertia in a second configuration, said first minimum cross-sectional moment of inertia being less than said second minimum cross-sectional moment of inertia so that said one configuration facilitates coiling said runner about itself for shipping and storage while said second configuration provides greater rigidity when said runner is in place dividing said land, said runner having a cross-sectional area, that is substantially uniform throughout its length, thereby facilitating manufacturing by way of plastic extrusion;

an anchor holding said runner to said land; and an upper lip disposed along said riser panel, said upper lip defining a groove into which said anchor engages.

2. A lawn edging for dividing land between a first section having a lawn and a second section beyond said lawn, said lawn being adapted for mowing by way of a lawnmower having a wheel, said lawn edging comprising:

a cover panel overlaying said first section having said lawn, said cover panel being of sufficient width to support said wheel;

a riser panel connected substantially perpendicular to said cover panel and extending substantially vertically between said first section having said lawn and said second section beyond said lawn, said cover panel in conjunction with said riser panel providing a runner that is resilient and reconfigurable for providing said runner with a first minimum cross-sectional moment of inertia in one configuration and having a second minimum cross-sectional moment of inertia in a second configuration, said first minimum cross-sectional moment of inertia being less than said second minimum cross-sectional moment of inertia so that said one configuration facilitates coiling said runner about itself for shipping and storage while said second configuration provides greater rigidity when said runner is in place dividing said land, said runner having a cross-sectional area, that is substantially uniform throughout its length, thereby facilitating manufacturing by way of plastic extrusion; and an anchor holding said runner to said land, said anchor overlaying said cover panel with said runner in said working position.

3. A lawn edging for dividing land between a first section having a lawn and a second section beyond said lawn, said lawn being adapted for mowing by way of a lawnmower having a wheel, said lawn edging comprising:

a cover panel overlaying said first section having said lawn, said cover panel being of sufficient width to support said wheel;

a riser panel connected substantially perpendicular to said cover panel and extending substantially vertically between said first section having said lawn and said second section beyond said lawn, said cover panel in conjunction with said riser panel providing a runner that is resilient and reconfigurable for providing said runner with a first minimum cross-sectional moment of inertia in one configuration and having a second minimum cross-sectional moment of inertia in a second configuration, said first minimum cross-sectional moment of inertia being less than said second minimum cross-sectional moment of inertia so that said one configuration facilitates coiling said runner about itself for shipping and storage while said second configuration provides greater rigidity when said runner is in place dividing said land, said runner having a cross-sectional area, that is substantially uniform throughout its length, thereby facilitating manufacturing by way of plastic extrusion;

an anchor holding said runner to said land; and two spaced apart grooves in said runner, said anchor engaging said two spaced apart grooves when said runner is in said working position.

4. A lawn edging for dividing land between a first section having a lawn and a second section beyond said lawn, said lawn being adapted for mowing by way of a lawnmower having a wheel, said lawn edging comprising:

a cover panel overlaying said first section having said lawn, said cover panel being of sufficient width to support said wheel;

a riser panel connected substantially perpendicular to said cover panel and extending substantially vertically between said first section having said lawn and said second section beyond said lawn, said cover panel in conjunction with said riser panel providing a runner that is resilient and reconfigurable for providing said runner with a first minimum cross-sectional moment of inertia in one configuration and having a second minimum cross-sectional moment of inertia in a second configuration, said first minimum cross-sectional moment of inertia being less than said second minimum cross-sectional moment of inertia so that said one configuration facilitates coiling said runner about itself for shipping and storage while said second configuration provides greater rigidity when said runner is in place dividing said land, said runner having a cross-sectional area, that is substantially uniform throughout its length, thereby facilitating manufacturing by way of plastic extrusion;

an anchor holding said runner to said land; and a fastener attaching said anchor to said runner when said runner is in said working position.

5. A lawn edging for dividing land between a first section having a lawn and a second section beyond said lawn, said lawn being adapted for mowing by way of a lawnmower having a wheel, said lawn edging comprising:

a runner having a substantially uniform cross-sectional area facilitating manufacturing by way of extrusion, said runner being resilient and including an integral hinge rendering said runner reconfigurable between a first configuration having a first minimum cross-sectional moment of inertia and a second configuration having a second minimum cross-sectional moment of inertia, said runner being re-positionable between a storage position and a working position, said first minimum cross-sectional moment of inertia being less than said second minimum cross-sectional moment of inertia so that in said storage position said runner assumes said first configuration for facilitating coiling said runner about itself and in said working position said runner assumes said second configuration for greater rigidity, said runner including a cover panel and a riser panel, integrally joined to each other by way of said integral hinge, in said working position said cover panel overlays said first section having a lawn and lays along a path having a corner with said cover panel overlapping itself at said corner, further in said working position said riser panel is substantially perpendicular to said cover panel and extends substantially vertically between said first section having said lawn and said second section beyond said lawn, said riser panel having a lip defining a groove along an upper edge of said riser panel;

an anchor engaging said groove, overlaying said cover panel, and penetrating said land to hold said runner against said land in said working position; and a splice separated and reconnected to said runner to overlap said riser panel and engage said groove at said corner.

6. The lawn edging of claim 5 wherein said runner has two spaced apart grooves into which said anchor engages.

7. The lawn edging of claim 5 further comprising a fastener attaching said anchor to said runner.

8. The lawn edging of claim 5 wherein said riser panel abuts a wall on said second section beyond said lawn when said runner is in said working position.

* * * * *